US010675652B2

(12) United States Patent
Tian et al.

(10) Patent No.: US 10,675,652 B2
(45) Date of Patent: Jun. 9, 2020

(54) PLATE PRE-PROCESSING METHOD AND ALIGNMENT FILM PREPARATION SYSTEM

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Wei Tian, Beijing (CN); Yuxin Deng, Beijing (CN); Xianfeng Zheng, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/674,358

(22) Filed: Aug. 10, 2017

(65) Prior Publication Data

US 2018/0043387 A1 Feb. 15, 2018

(30) Foreign Application Priority Data

Aug. 10, 2016 (CN) .......................... 2016 1 0653710

(51) Int. Cl.
*G02F 1/1337* (2006.01)
*B05C 1/08* (2006.01)
(Continued)

(52) U.S. Cl.
CPC .......... *B05C 1/0813* (2013.01); *B05C 1/0808* (2013.01); *B05D 1/28* (2013.01);
(Continued)

(58) Field of Classification Search
CPC ... B05C 1/0813; B05C 1/0808; G02F 1/1337; G02F 1/1303; G02F 1/13378;
(Continued)

(56) References Cited

U.S. PATENT DOCUMENTS 5,090,312 A * 2/1992 Ohinata .................. B41L 13/04
101/116
2005/0241573 A1* 11/2005 Ogawa ..................... B05C 1/08
118/258
(Continued)

FOREIGN PATENT DOCUMENTS

CN 102385194 A 3/2012
CN 202256967 U 5/2012
(Continued)

OTHER PUBLICATIONS

Office Action dated Oct. 17, 2018 issued in corresponding Chinese Application No. 201610653710.3.

*Primary Examiner* — Laura Edwards
(74) *Attorney, Agent, or Firm* — Nath, Goldberg & Meyer; Joshua B. Goldberg

(57) ABSTRACT

The disclosure provides a transfer plate pre-processing device. The transfer plate comprises first and second surfaces, and recesses in an array are arranged on the first surface. The transfer plate pre-processing device comprises: a cylinder having a bearing surface that can be attached to the second surface of the transfer plate and to support the transfer plate; and a pressurization structure having a pressurizing surface. The cylinder can roll along the pressurizing surface, and when the cylinder is rolling, the first surface of the transfer plate is brought into contact with and pressed against pressurizing surface. Accordingly, the disclosure also provides a transfer plate pre-processing method and an (Continued)

alignment film preparation system. According the disclosure, the wettability of the transfer plate can be improved.

18 Claims, 6 Drawing Sheets

(51) Int. Cl.
    *G02F 1/13*     (2006.01)
    *B05D 1/28*     (2006.01)
    *B05D 3/02*     (2006.01)

(52) U.S. Cl.
    CPC ......... *B05D 3/0218* (2013.01); *G02F 1/1303* (2013.01); *G02F 1/1337* (2013.01)

(58) Field of Classification Search
    CPC ....... B41M 1/00; B41F 30/04; H01L 51/0004; H01L 51/0001; B41C 1/00; B41C 1/06; B41C 1/10; B41C 1/18; B41N 10/02; B29C 59/046; B05D 1/28; B05D 3/0218
    USPC .... 101/119, 120, 216, 217, 486, 492, 401.1; 118/211
    See application file for complete search history.

(56) References Cited

U.S. PATENT DOCUMENTS

| | | | |
|---|---|---|---|
| 2006/0117974 A1* | 6/2006 | Holm | B41F 7/04 |
| | | | 101/217 |
| 2009/0193991 A1* | 8/2009 | Rossini | B41N 10/02 |
| | | | 101/453 |
| 2011/0293818 A1* | 12/2011 | Madigan | B41F 16/00 |
| | | | 427/66 |
| 2012/0247387 A1 | 10/2012 | Soma | |
| 2017/0276981 A1 | 9/2017 | Zheng et al. | |

FOREIGN PATENT DOCUMENTS

| | | | |
|---|---|---|---|
| CN | 102728516 A | | 10/2012 |
| CN | 103962335 A | | 8/2014 |
| CN | 104216106 A | | 12/2014 |
| CN | 105425431 A | | 3/2016 |
| JP | 2009-175247 | * | 8/2009 |
| WO | 2011/075299 A1 | | 6/2011 |

* cited by examiner

PLATE PRE-PROCESSING METHOD AND ALIGNMENT FILM PREPARATION SYSTEM

CROSS-REFERENCE TO RELATED APPLICATION

This application claims the priority of Chinese Patent Application No. 201610653710.3 filed on Aug. 10, 2016, titled "TRANSFER PLATE PRE-PROCESSING DEVICE AND TRANSFER PLATE PRE-PROCESSING METHOD, ALIGNMENT FILM PREPARATION SYSTEM" in the Chinese Intellectual Property Office, the entire content of which is incorporated herein by reference.

FIELD OF THE INVENTION

The disclosure relates to the field of the manufacturing of display device, and particularly to a transfer plate pre-processing device, a transfer plate pre-processing method and an alignment film preparation system.

BACKGROUND OF THE INVENTION

In a liquid crystal display panel, alignment films for aligning the liquid crystal are provided on opposite surfaces of an array substrate and a cell substrate. In the process of manufacturing the liquid crystal display panel, aligning agent is first applied to a substrate to form an alignment film, and then the alignment film is subject to a photo alignment or a rubbing alignment. At present, a device for applying the aligning agent can include an instilment structure 70, a distributing roller 80, a cylinder, and a transfer plate 20 surrounding the cylinder, as shown in FIGS. 1a and 1b. During the application of the aligning agent, the aligning agent is instilled onto the distributing roller 80, and then the distributing roller transfers the aligning agent onto the transfer plate 20. Subsequently, with a rotation of the cylinder, the aligning agent on the transfer plate can be transferred onto the substrate.

A wetting phenomenon occurs when liquid is brought into contact with a solid body. When a contact angle θ between the liquid and a solid surface is an acute angle, it can indicates that the solid surface inclines to be wetted by the liquid, that is, the solid surface has a good wettability (as shown in FIG. 1a); when the angle θ is an obtuse angle, it can indicates that the solid surface is not easily wetted by the liquid (as shown in FIG. 1b). To improve the wettability of a solid surface, a roughening process can be made to the solid surface. For the transfer plate, recesses in an array are usually arranged on its surface to hold the aligning agent to a certain degree. However, the transfer plate is made of resin material. At an early stage of use, the transfer plate may show a poor wettability, which has a strong impact on an amount of the aligning agent held thereon, such that the resulted alignment film may have a small thickness and a poor uniformity.

SUMMARY OF THE INVENTION

Objectives of the disclosure is to address at least one of problems in the prior art, and provides a transfer plate pre-processing device, a transfer plate pre-processing method and an alignment film preparation system, to improve the wettability of the transfer plate.

To address one of above problems, the disclosure provides a transfer plate pre-processing device, comprising a transfer plate, a cylinder, a pressurization structure. The transfer plate comprises a first surface and a second surface which are opposite to each other, recesses in an array are arranged on the first surface.

the cylinder, having a bearing surface that is configured to be attached to the second surface of the transfer plate and to support the transfer plate; and the pressurization structure, having a pressurizing surface, wherein, the cylinder is configured to roll along the pressurizing surface of the pressurization structure, and when the cylinder carrying the transfer plate is rolling, the first surface of the transfer plate is brought into contact with and pressed against pressurizing surface.

Preferably, the pressurization structure is configured as a cylindrical structure surrounding the cylinder, an axis of the cylinder is parallel with an axis of the pressurization structure, and the pressurizing surface corresponds to an inner surface of the cylindrical structure.

Preferably, the pressurization structure is divided into a first wetting part and a second wetting part; a plurality of first through-holes penetrating the first wetting part in a radial direction of the pressurization structure are arranged in the first wetting part; a plurality of second through-holes penetrating the second wetting part in the radial direction of the pressurization structure are arranged in the second wetting part; and each of inner diameters of the first through-hole and the second through-hole is not more than an inner diameter of an opening of the recess.

Preferably, the first through-hole has a first opening far away from the axis of the pressurization structure and a second opening close to the axis of the pressurization structure, an inner diameter of the second opening of the first through-hole is equivalent to the inner diameter of the opening of the recess on the transfer plate, and an inner diameter of the first opening of the first through-hole is less than the inner diameter of the second opening of the first through-hole.

Preferably, the second through-hole has a first opening close to the axis of the pressurization structure and a second opening far away from the axis of the pressurization structure, an inner diameter of the first opening of the second through-hole is less than the inner diameter of the opening of recess on the transfer plate, and an inner diameter of the second opening of the second through-hole is less than the inner diameter of the first opening of the second through-hole.

Preferably, the second through-hole comprises a tapered through-hole part and a cylindrical through-hole part which are arranged to be coaxial, one end of the tapered through-hole part is the first opening of the second through-hole, and the other end of the tapered through-hole part is in communication with one end of the cylindrical through-hole part, and the other end of the cylindrical through-hole part is the second opening of the second through-hole.

Preferably, the transfer plate pre-processing device further comprises a fluid supply structure and a fluid pumping structure, the fluid supply structure and the fluid pumping structure are disposed on a side of the pressurization structure far away from the cylinder, the fluid supply structure is configured to introduce the aligning agent to the first through-hole, the fluid pumping structure is configured to extract the aligning agent out of the second through-hole, when the transfer plate is brought into contact with and pressurized against the first wetting part, the aligning agent in the pressurized first through-hole is able to flow into the recess of the transfer plate, and when the transfer plate is brought into contact with and pressurized against the second wetting part, the aligning agent in the recess of the transfer plate is able to flow into the pressurized second through-hole.

Preferably, when the cylinder is rolling, the fluid supply structure and the fluid pumping structure are both able to move along a circumferential direction of the pressurization structure with respect to the pressurization structure, during the movement, the fluid supply structure and the fluid pumping structure are kept stationary relatively to an axis of the cylinder, during the movement, the fluid supply structure and the fluid pumping structure are positioned on both side of a position where the transfer plate is in contact with and pressurized against the pressurization structure, respectively, and a distance of the fluid supply structure from the pressurized position and a distance of the fluid pumping structure from the pressurized position are both less than a predefined value.

Preferably, the transfer plate pre-processing device further comprises a bearing structure provided outside the pressurization structure, the bearing structure being fixed to the pressurization structure, the bearing structure comprises a main body and a receiving chamber inside the main body, the fluid supply structure and the fluid pumping structure being positioned within the receiving chamber, and an opening is formed on a surface of the main body facing the pressurization structure, through which the fluid supply structure introduces the aligning agent into the first through-hole and through which the fluid pumping structure extracts the aligning agent out of the second through-hole.

Preferably, the main body comprises a cylindrical first wall, a cylindrical second wall provided outside the first wall and a connecting wall for connecting the first wall and the second wall, the first wall, the second wall and the connecting wall form the receiving chamber, the opening is formed in the first wall, and the pressurization structure is fixed to the first wall.

Preferably, a guide rail is provided in the receiving chamber and arranged so as to surround the pressurization structure along the circumferential direction of the pressurization structure; and the fluid supply structure and the fluid pumping structure are movably mounted on the guide rail.

Preferably, sensors are provided at joints between the first wetting part and the second wetting part, and the sensors are configured to detect whether the fluid supply structure and the fluid pumping structure pass through the positions corresponding to the sensors.

Accordingly, the disclosure also provides a transfer plate pre-processing method using above transfer plate pre-processing device. The transfer plate pre-processing method comprises steps of:

before applying aligning agent to a substrate, providing a transfer plate around a bearing surface of a cylinder, wherein the transfer plate comprises a first surface and a second surface which are opposite to each other, recesses in an array are arranged on the first surface, and the second surface is attached to the bearing surface of the cylinder; and controlling the cylinder so as to roll along a pressurizing surface of a pressurization structure, such that when the cylinder is rolling, the first surface of the transfer plate is brought into contact with and pressed against the pressurizing surface of the pressurization structure.

Accordingly, the disclosure also provides an alignment film preparation system. The alignment film preparation system comprises an aligning agent application device and above transfer plate pre-processing device. The aligning agent application device comprises a transfer plate, the transfer plate being configured to transfer aligning agent to a substrate to form an alignment film, wherein the transfer plate is a transfer plate pre-processed by the transfer plate pre-processing device.

In the disclosure, as the transfer plate is pressurized against the pressurization structure, the slope angle of the recess of the transfer plate can increase, advantageously holding the aligning agent in the recess. At this point, with the increase in the slope angle, the capacity of the recess can increase, thereby improving a liquid carrying volume of the transfer plate. In other words, the wettability of the transfer plate is improved. Therefore, before the aligning agent is applied to the substrate to prepare an alignment film, the transfer plate can be pre-processed by the transfer plate pre-processing device to increase the liquid carrying volume of the transfer plate. As such, it is possible to prevent the alignment film having a small thickness due to the poor wettability of the transfer plate when preparing the alignment film, improving the preparation effect of the alignment film.

BRIEF DESCRIPTION OF THE DRAWINGS

Accompanying drawings are provided for further understanding of this disclosure and constitute a part of the specification. Hereinafter, these drawings are intended to explain the disclosure together along with the following specific embodiments, but should not be considered as a limitation of the disclosure. In which.

Figure 1A:
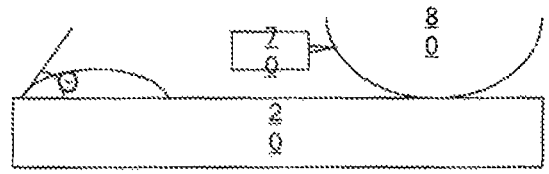
FIG. 1a is a schematic diagram showing a contact status of liquid with a solid body.
Figure 1B:
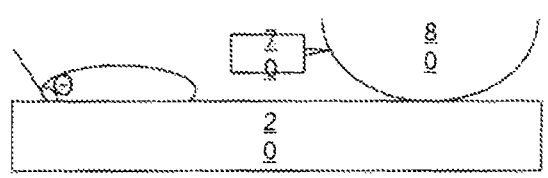
FIG. 1b is another schematic diagram showing a contact status of the liquid with the solid body.

REFERENCE NUMERAL LIST 10, a cylinder; 20, a transfer plate; 21, a recess; 30, a pressurization structure; 31, a first wetting part; 31a, a first through-hole; 32, a second wetting part; 32a, a second through-hole; 321a, a tapered through-hole part; 322a, a cylindrical through-hole part; 40, a fluid supply structure; 50, a fluid pumping structure; 60, a bearing structure; 61, a main body; 611, a first wall; 612, a second wall; 613, a connecting wall; 62, a receiving chamber; 63, a guide rail.

DETAILED DESCRIPTION OF THE EMBODIMENTS

The specific embodiments of the disclosure will be further described in detail in conjunction with the accompanying drawings. It should be understood that the specific embodiments described herein are provided for the purpose of explanation and illustration of the disclosure but not intended to limit the disclosure.

Figure 2:
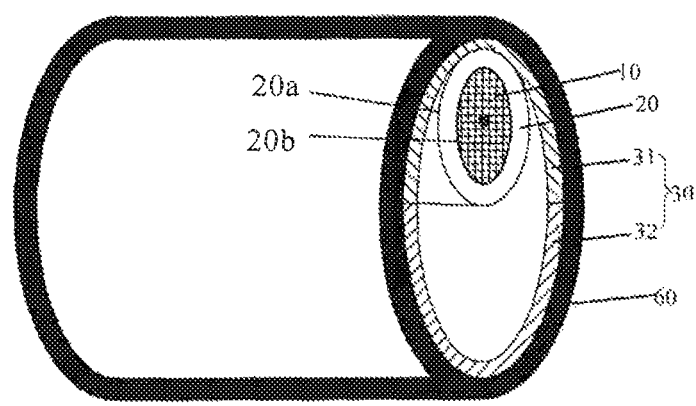
FIG. 2 is a schematic diagram showing an overall structure of a transfer plate pre-processing device according to the disclosure.
Figure 3:
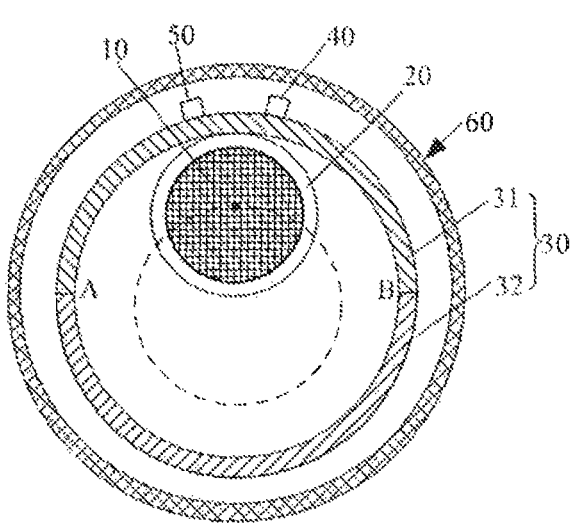
FIG. 3 is a cross-sectional diagram of the transfer plate pre-processing device as shown in FIG. 2 taken along a radial direction thereof.
Figure 4:
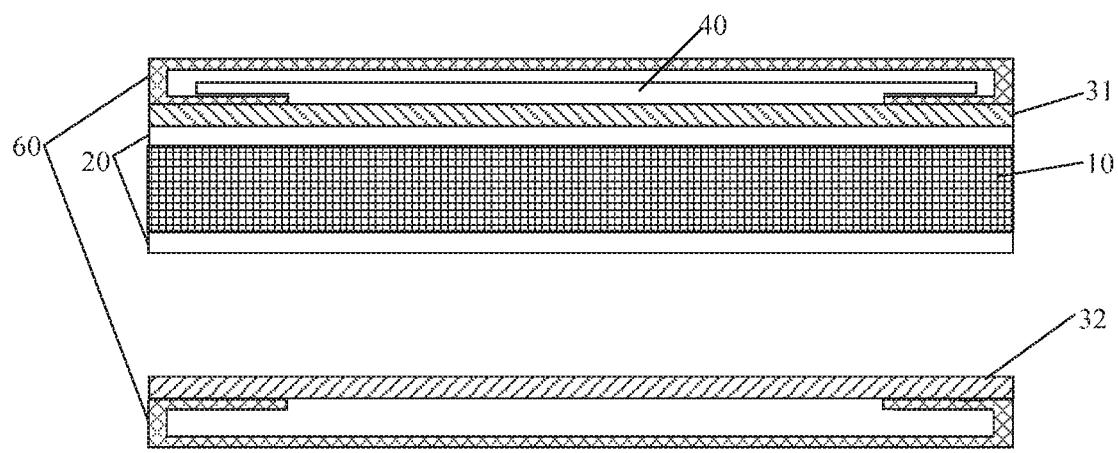
FIG. 4 is a cross-sectional diagram of the transfer plate pre-processing device as shown in FIG. 2 taken along an axial direction of a cylinder thereof.
Figure 5A:
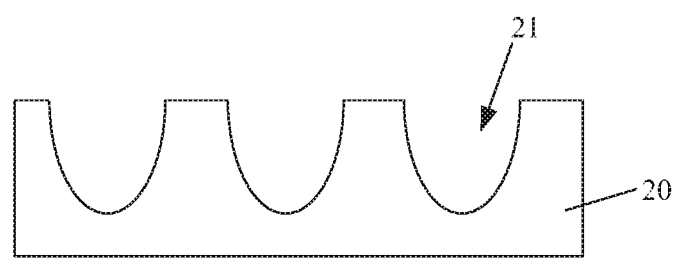
FIG. 5a is a schematic diagram showing the shape of recesses on a transfer plate in an initial state.
Figure 5B:
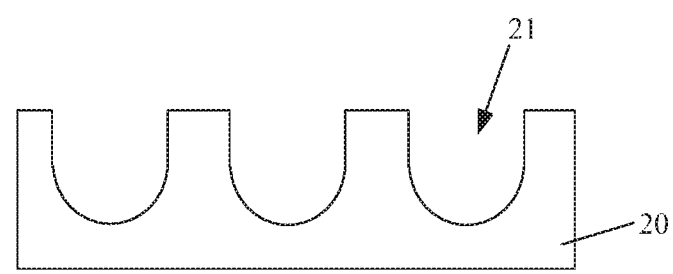
FIG. 5b is a schematic diagram showing the shape of recesses on the transfer plate after pre-processing.

As one aspect of the disclosure, there is provided a transfer plate pre-processing device, for pre-processing a transfer plate before aligning agent (PI agent) is applied to a substrate. FIG. 2-FIG. 4 are schematic diagrams showing a structure of the transfer plate pre-processing device according to the disclosure; FIG. 5a and FIG. 5b are schematic diagrams showing a structure of the transfer plate. Hereinafter, the transfer plate pre-processing device according to the disclosure will be described in conjunction with FIG. 2 to FIG. 5. The transfer plate 20 comprises a first surface 20a and a second surface 20b which are opposite to each other. Recesses 21 in an array (such as 400Line/in) are arranged on the first surface. It should be understood that a depth of the recess 21 (for example, 15 micrometers) is less than a thickness of the transfer plate 20. The transfer plate pre-processing device comprises a roller-shaped cylinder 10 and a pressurization structure 30. The cylinder 10 has a bearing surface that is configured to be attached to the second surface of the transfer plate 20 and to support the transfer plate 20; the pressurization structure 30 has a pressurizing surface. The cylinder 10 is able to roll along the pressurizing surface of the pressurization structure 30, and when the cylinder 10 is rolling, the first surface of the transfer plate 20 is brought into contact with and pressed against the pressurizing surface. It should be explained that the transfer plate 20 is usually made of the resin material, such that the pressurizing force between the transfer plate 20 and the pressurizing surface allows the transfer plate 20 to be deformed to a certain degree. In other words, when the cylinder 10 is rolling, a distance between an axis of the cylinder 10 and the pressurizing surface is less than a sum of a radius of the cylinder 10 and a thickness of the transfer plate 20.

The cylinder 10 in the transfer plate pre-processing device has the same roller shape as the cylinder subsequently supporting the transfer plate 20 when the aligning agent is applied to the substrate. The process of the rolling of the cylinder along the pressurizing surface (i.e., a process of pre-processing the transfer plate 20) is equivalent to simulating a process of bringing the transfer plate 20 into contact with a substrate before the aligning agent is applied to the substrate. In particular, as shown in FIG. 5a, the recess 21 of the transfer plate 20 in its initial state has a small slope angle, adversely holding the aligning agent in the recess 21. Further, the recess 21 in such a shape has a relatively small capacity. As the transfer plate 20 is pressurized against the pressurization structure 30, as shown in FIG. 5b, the slope angle of the recess 21 of the transfer plate 20 can increase, advantageously holding the aligning agent in the recess 21. At this point, with the increase in the slope angle, the capacity of the recess 21 can increase, thereby improving a liquid carrying volume of the transfer plate 20. In other words, the wettability of the transfer plate 20 is improved. Therefore, before the aligning agent is applied to the substrate to prepare an alignment film, the transfer plate 20 can be pre-processed by the transfer plate pre-processing device to increase the liquid carrying volume of the transfer plate 20. As such, it is possible to prevent the alignment film having a small thickness due to the poor wettability of the transfer plate 20 when preparing the alignment film, improving the preparation effect of the alignment film.

Herein, the pressurization structure 30 may be a platform structure having a flat pressurizing surface. Alternatively, the pressurization structure 30 may be a columnar or cylindrical structure having a curved pressurizing surface. FIG. 2 and FIG. 3 illustrate the shape of the pressurization structure 30 according to the disclosure. As shown in FIG. 2 and FIG. 3, the pressurization structure 30 is formed as a cylindrical structure surrounding the cylinder 10. An axis of the cylinder 10 is parallel with an axis of the pressurization structure 30. The pressurizing surface corresponds to an inner surface of the cylindrical structure. When the cylinder 10 rolls along the pressurizing surface, trace of the axis of the cylinder 10 is depicted by a dashed line in FIG. 3.

Figure 6A:
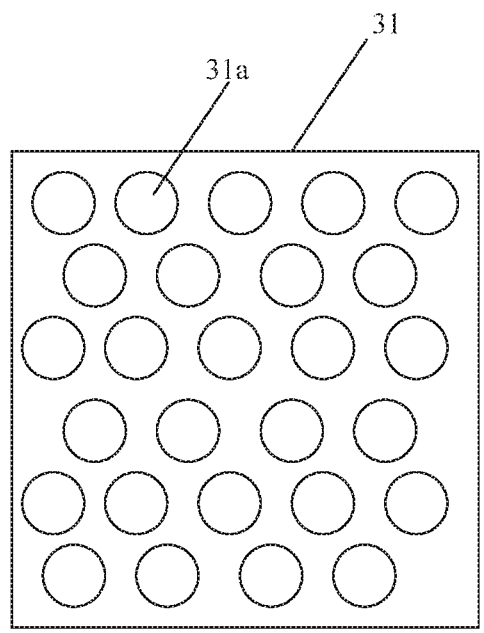
FIG. 6a is a schematic diagram showing a distribution of first through-holes on a first wetting part.
Figure 6B:
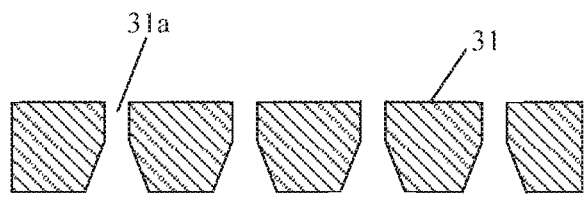
FIG. 6b is a cross-sectional diagram of the first wetting part taken along the axial direction of the cylinder.
Figure 7A:
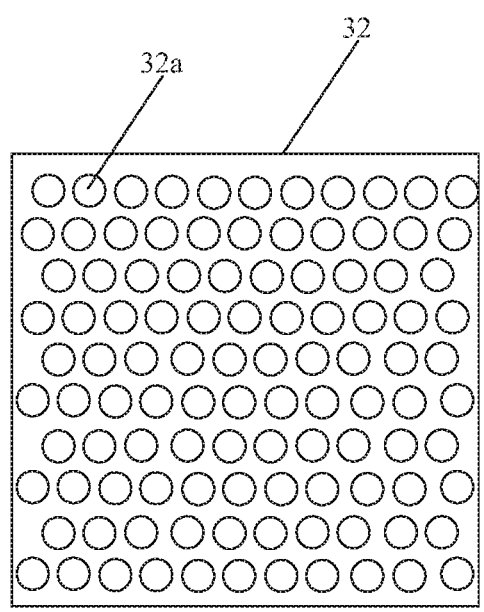
FIG. 7a is a schematic diagram showing a distribution of second through-holes on a second wetting part.
Figure 7B:
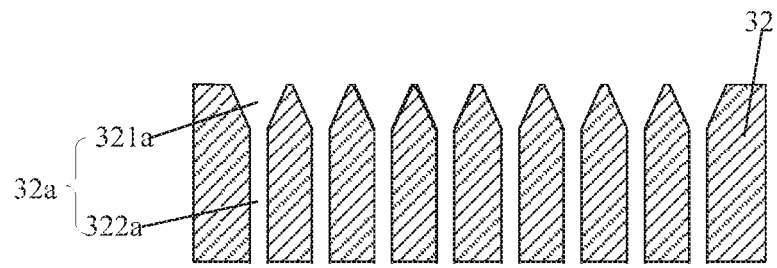
FIG. 7b is a cross-sectional diagram of the second wetting part taken along the axial direction of the cylinder.

Further, as shown in FIG. 2 and FIG. 3, the pressurization structure 30 is divided into a first wetting part 31 and a second wetting part 32. A plurality of first through-holes 31a (as shown in FIG. 6a and FIG. 6b) penetrating the first wetting part 31 in a radial direction of the pressurization structure 30 are arranged in the first wetting part 31; a plurality of second through-holes 32a (as shown in FIG. 7a and FIG. 7b) penetrating the second wetting part 32 in the radial direction of the pressurization structure 30 are arranged in the second wetting part 32; each of inner diameters of the first through-hole 31a and the second through-hole 32a is not more than an inner diameter of an opening of the recess 21 on the transfer plate 20. It should be understood that, when the opening of the recess 21 is a circular shape, the inner diameter of the opening may correspond to a diameter of the opening, and when the opening of the recess 21 is a rectangular shape, the inner diameter of the opening may correspond to a width of the opening.

It should be understood, in the case where the pressurizing surface of the pressurization structure 30 are a smooth surface, when the transfer plate 20 is pressurized against the pressurizing surface, negative pressure may be generated within the recess 21. The recess 21 may get back into shape when it is separated from the pressurizing surface. By providing the first through-holes 31a and the second through-holes 32a in the pressurizing surface, the inside of the recess 21 can be prevented from generating the negative pressure when the transfer plate 20 is pressurized against the pressurizing surface. Further, after the pre-processing, the slope angle of the recess 21 of the transfer plate 20 can significantly increase.

Figure 8A:
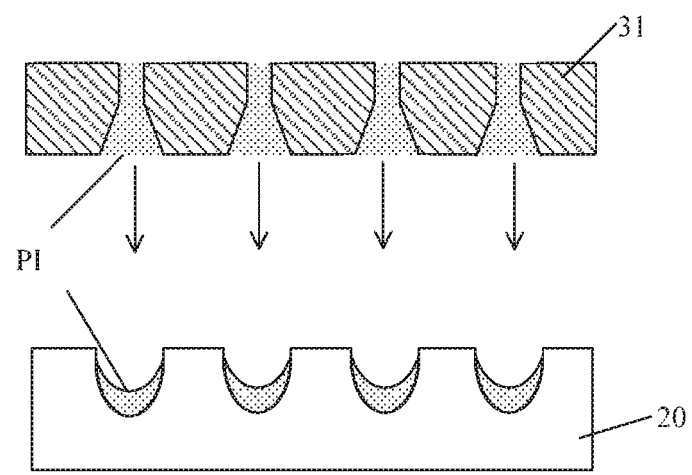
FIG. 8a is a schematic diagram showing a flow of aligning agent between the first wetting part and the transfer plate.
Figure 8B:
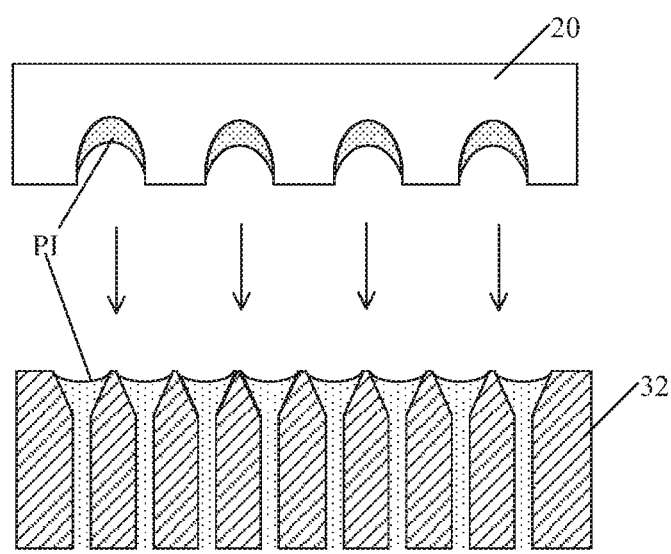
FIG. 8b is a schematic diagram showing a flow of the aligning agent between the transfer plate and the second wetting part.

Further, when the aligning agent is applied to the substrate in the processes of preparing the alignment film, the aligning agent is first instilled onto a distributing roller and then transferred to the transfer plate. Then the aligning agent on the transfer plate is transferred to the substrate. After the first through-holes 31a and the second through-holes 32a are provided, the processes of applying the aligning agent can be simulated. In particular, the aligning agent is instilled into the first through-holes 31a, such that when the first through-holes 31a having aligning agent received therein are pressed against the transfer plate 20, the aligning agent can flows into the recesses 21 of the transfer plate (as shown in FIG. 8a). This procedure corresponds to a procedure where the aligning agent on the distributing roller is conveyed onto the transfer plate 20. When the transfer plate 20 is pressed against the second wetting part 32, the aligning within the agent recesses 21 can flow into the second through-holes 32a (as shown in FIG. 8b). This procedure corresponds to a procedure where the aligning agent on the transfer plate is transferred onto the substrate. Before the aligning agent is actually applied to the substrate, by above simulation processes, the aligning agent can be in contact with and separated from the recesses of the transfer plate. In such a manner, the recesses 21 can be lubricated, such that a resistance of the aligning agent in the recesses 21 can be reduced when the aligning agent is subsequently applied to the substrate. It should be understood that, the recess 21 on the transfer plate 20 is such a micro pore in micrometer scale, and inner diameters of the first through-hole 31a and the second through-hole 32a are not more than the inner diameter of the recess 21 on the transfer plate 20. Therefore, in an unpressurized state, the aligning agent within the first through-hole 31a and the second through-hole 32a cannot flow out of the through-holes due to an effect of interfacial tension.

It should be understood that the distributing roller can also be provided with recesses for receiving the aligning agent. In order that the pre-processing of the transfer plate 20 can more effectively improve the wettability of the transfer plate 20, preferably, a procedure of the aligning agent flowing into the recesses 21 of the transfer plate 20 during the pre-processing of the transfer plate is made as no difference as possible than a procedure of the aligning agent flowing into the recesses 21 of the transfer plate 20 during the preparation of the alignment film. For this reason, the shape of the first through-hole 31a in the first wetting part 31 can be formed to be similar to that of the recess of the distributing roller. In particular, as shown in FIG. 6b, the first through-hole 31a may have a first opening (i.e., an upper opening) far away from the axis of the pressurization structure 30 and a second opening (i.e., a lower opening) close to the axis of the pressurization structure 30. An inner diameter of the second opening of the first through-hole 31a is equivalent to the inner diameter of the opening of the recess 21 on the transfer plate 20. An inner diameter of the first opening of the first through-hole 31a is less than the inner diameter of the second opening of the first through-hole 31a. More particularly, the inner diameter of the first opening of the first through-hole 31a is one third of the inner diameter of the second opening. FIG. 6b illustrates a shape of the first through-hole 31a. From the first opening through to the second opening, the inner diameter of the first through-hole 31a remains unchanged first, and then increases gradually. Therefore, the first through-hole 31a comprises a cylindrical part and a tapered part. Of course, the first through-hole 31a may also be in a tapered shape with an inner diameter gradually increasing from the first opening to the second opening.

Similarly, a procedure of the aligning agent flowing out of the recesses during the pre-processing of the transfer plate is made as no difference as possible compared to a procedure of the aligning agent flowing out of the recesses during the preparation of the alignment film. For this reason, the inner diameter of the second through-hole 32a is formed as small as possible, such that the contact of the transfer plate 20 with the second wetting part 32 may correspond to a contact with a continuous surface. In particular, as shown in FIG. 7b, the second through-hole 32a may have a first opening (i.e., an upper opening) close to the axis of the pressurization structure 30 and a second opening (i.e., a lower opening) far away from the axis of the pressurization structure 30. An inner diameter of the first opening of the second through-hole 32a is less than the inner diameter of the opening of recess 21 on the transfer plate 20. An inner diameter of the second opening of the second through-hole 32a is less than the inner diameter of the first opening of the second through-hole 32a. During the pre-processing of the transfer plate, the aligning agent flows from the first opening of the second through-hole 32a to the second opening. Therefore, the inner diameter of the second opening less than that of the first opening may further prevent the aligning agent from flowing out of the second wetting part 32.

More particularly, as shown in FIG. 7b, the second through-hole 32a comprises a tapered through-hole part 321a and a cylindrical through-hole part 322a which are arranged to be coaxial. One end of the tapered through-hole part 321a is the first opening of the second through-hole 32a, and the other end of the tapered through-hole part 321a is in communication with one end of the cylindrical through-hole part 322a. The other end of the cylindrical through-hole part 322a is the second opening of the second through-hole 32a. In the disclosure, the inner diameter of the first opening of the second through-hole 32a is half the inner diameter of the opening of the recess 21 on the transfer plate 20, and the inner diameter of the second opening of the second through-hole 32a is half the inner diameter of the first opening of the second through-hole 32a.

Optionally, a circumferential perimeter of the pressurization structure 30 is twice as much as that of the cylinder 10. As such, in the case where a size of the transfer plate pre-processing device is as small as possible, when the cylinder 10 rolls along the pressurization structure 30 by a period, it can be ensured that all the recesses on the transfer plate 20 are completely come into contact with and separated from the aligning agent. Of course, the circumferential perimeter of the pressurization structure 30 also may be n times as much as that of the cylinder 10, wherein n>2. At this point, planes in which the axis of the pressurization structure 30 is positioned can divide the pressurization structure 30 into four, six or more wetting parts. In this case, for the adjacent two wetting parts, one wetting part is provided with the first through-hole, and the other wetting part is provided with the second through-hole.

Referring to FIG. 3 again, the transfer plate pre-processing device can further include a fluid supply structure 40 and a fluid pumping structure 50, wherein the fluid supply structure 40 and the fluid pumping structure 50 are disposed on a side of the pressurization structure 30 far away from the cylinder 10, the fluid supply structure 40 is configured to introduce the aligning agent to the first through-hole 31a, and the fluid pumping structure 50 is configured to extract the aligning agent out of the second through-hole 32a. When the transfer plate 20 is brought into contact with and pressurized against the first wetting part 31, the aligning agent in the pressurized first through-hole 31a is able to flow into the recess of the transfer plate 20; and when the transfer plate 20 is brought into contact with and pressurized against the second wetting part 32, the aligning agent in the recess of the transfer plate 20 is able to flow into the pressurized second through-hole 32a, such that the aligning agent is allowed to be regularly into contact with and separated from the recesses 21 of the transfer plate 20.

Preferably, when the cylinder 10 is rolling, the fluid supply structure 40 and the fluid pumping structure 50 are both able to move along a circumferential direction of the pressurization structure 30 with respect to the pressurization structure 30, but during the movement, the fluid supply structure 40 and the fluid pumping structure 50 are kept stationary relatively to an axis of the cylinder 10. During the movement, the fluid supply structure 40 and the fluid pumping structure 50 are positioned on both side of a position where the transfer plate 20 is in contact with and pressurized against the pressurization structure 30, respectively, and a distance of the fluid supply structure 40 from the pressurized position and a distance of the fluid pumping structure 50 from the pressurized position are both less than a predefined value. Optionally, the predefined value is the radius of the cylinder. Further, in practice, a rolling direction of the cylinder 10 (i.e., a moving direction of the fluid supply structure 40 and the fluid pumping structure 50) can be adjusted, such that the fluid supply structure 40 is in front of the fluid pumping structure 50. As such, after the fluid supply structure 40 introduces the aligning agent into the first through-hole 31a, the transfer plate 20 can reach shortly the position of the first through-hole 31a in which the aligning agent is received, reducing a retention time of the aligning agent held within the first through-hole 31a; after the transfer plate 20 is pressurized against the second wetting part 32 such that the aligning agent flows into the second through-hole 32a, the fluid pumping structure 50 can reach shortly the position of the second through-hole 32a in which the aligning agent is received, reducing a retention time of the aligning agent held within the second through-hole 32a.

Herein, the fluid supply structure 40 and the fluid pumping structure 50 both can include an air pump, a storage chamber and a valve. When fluid is supplied by the fluid supply structure 40, the valve is opened and at the same time the air pump inflates the storage chamber to provide positive pressure, such that the aligning agent within the storage chamber is introduced into the first through-hole 31a. When the fluid is extracted by the fluid pumping structure, the valve is opened, and at the same time the air pump exhausts the storage chamber to provide negative pressure, such that the aligning agent within the second through-hole 32a is extracted.

Figure 9:
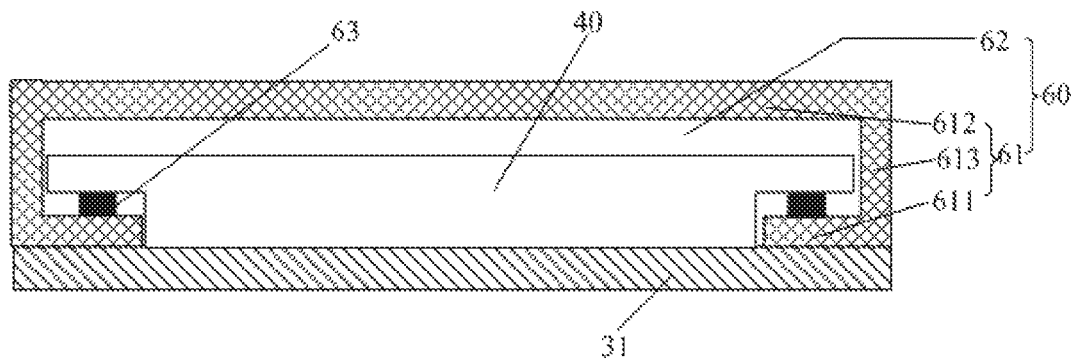
FIG. 9 is a schematic diagram showing an arrangement of a fluid supply structure.

Further, as shown in FIG. 2 to FIG. 4, the transfer plate pre-processing device may include a bearing structure 60 provided outside the pressurization structure 30. The bearing structure 60 is also in a sleeve shape. The bearing structure 60 is fixed to the pressurization structure 30, so as to provide a stable support for the pressurization structure 30. As shown in FIG. 9, the bearing structure 60 comprises a main body 61 and a receiving chamber 62 inside the main body 61. The fluid supply structure 40 and the fluid pumping structure 50 are positioned within the receiving chamber 62. An opening is formed on a surface of the main body 61 facing the pressurization structure 30, through which the fluid supply structure 40 introduces the aligning agent into the first through-hole 31a, and through which the fluid pumping structure 50 extracts the aligning agent out of the second through-hole 32a.

In particular, as shown in FIG. 9, the main body 61 comprises a cylindrical first wall 611, a cylindrical second wall 612 provided outside the first wall 61, and a connecting wall 613 for connecting the first wall 611 and the second wall 612; the first wall 611, the second wall 612 and the connecting wall 613 form the receiving chamber 62; the opening is formed in the first wall 611; the pressurization structure 30 is fixed to the first wall 611. The way of connection between the pressurization structure 30 and the first wall 611 is not restricted herein. For example, the pressurization structure 30 is fixed to the first wall 611 of the by a shape-fit connection between the pressurization structure 30 and the first wall 611.

As shown in FIG. 9, a guide rail 63 is provided in the receiving chamber 62 and arranged so as to surround the pressurization structure 30 along the circumferential direction of the pressurization structure; the fluid supply structure 40 and the fluid pumping structure 50 are movably mounted on the guide rail 63 so as to stably move along the circumferential direction of the pressurization structure 30. Herein, the guide rail 63 can be provided on the first wall 611, or alternatively can be provided on the second wall 612 or the connecting wall 613; the guide rail 63 particularly can use a rack-type guide rail, and pinions are provided both on the fluid supply structure 40 and the fluid pumping structure 50, such that the fluid supply structure 40 and the fluid pumping structure 50 can move along the guide rail 63 by engaging the rack and the opinion. A motor can be mounted on the fluid supply structure 40 and the fluid pumping structure 50, so as to provide power for the fluid supply structure 40 and the fluid pumping structure 50.

Further, sensors (not shown) are provided at joints between the first wetting part 31 and the second wetting part 32 (in FIG. 3, positions A and B). The sensors are configured to detect whether the fluid supply structure 40 and the fluid pumping structure 50 pass through the positions corresponding to the sensors. In practice, the sensors are electrically connected to the fluid supply structure 40 and the fluid pumping structure 50, respectively, so as to control ON and OFF of the fluid supply structure 40 and the fluid pumping structure 50 by judging whether they pass through the joints. For example, assuming that the cylinder 10 in FIG. 2 moves along a path as shown in a dashed line in a clockwise direction, when the sensor at position A detects that the fluid supply structure 40 passes through the position A, the fluid supply structure 40 is controlled to be opened; when the sensor at position A detects that the fluid pumping structure 50 passes through the position A, the fluid pumping structure 50 is controlled to be closed; when the sensor at position B detects that the fluid supply structure 50 passes through the position B, the fluid supply structure 50 is controlled to be closed; when the sensor at position B detects that the fluid pumping structure 50 passes through the position B, the fluid pumping structure 50 is controlled to be opened.

In the disclosure, the cylinder 10 and the bearing structure 60 can be made both of metallic material, and the pressurization structure 30 can be made of ceramic material.

As another aspect of the disclosure, there is provided a transfer plate pre-processing method using above transfer plate pre-processing device. The transfer plate pre-processing method can comprise steps of:

before applying aligning agent to a substrate, providing a transfer plate 20 around a bearing surface of a cylinder 10, wherein the transfer plate 20 comprises a first surface 20a and a second surface 20b which are opposite to each other, recesses 21 in an array (such as 400Line/in) are arranged on the first surface, and the second surface is attached to the bearing surface of the cylinder 10; and controlling the cylinder 10 so as to roll along a pressurizing surface of a pressurization structure 30, such that when the cylinder 10 is rolling, the first surface of the transfer plate 20 is brought into contact with and pressed against the pressurizing surface of the pressurization structure.

As explained above, the transfer plate pre-processing device can further include a fluid supply structure 40 and a fluid pumping structure 50, and the pressurization structure 30 is divided into a first wetting part 31 and a second wetting part 32. At this point, the transfer plate pre-processing method further comprises:

when the fluid supply structure 40 is positioned in a region of the first wetting part 31, controlling the fluid supply structure 40 to introduce the aligning agent into first through-holes 31a; when the fluid pumping structure 50 is positioned in a region of the second wetting part 32, controlling the fluid pumping structure 50 to extract the aligning agent out of second through-holes 32a, such that volumes of the recesses 21 on the transfer plate 20 increase due to the pressurization while the aligning agent is regularly into contact with and separated from the recesses 21. The pre-processing as set forth can serve as pre-wetting, such that when the aligning agent is subsequently applied to the substrate, the aligning agent receives a reduced resistance in the recesses 21.

Hereinafter, the pre-processing of the transfer plate by using the transfer plate pre-processing device will be described with reference to FIG. 10a-FIG. 10e.

Figure 10A:
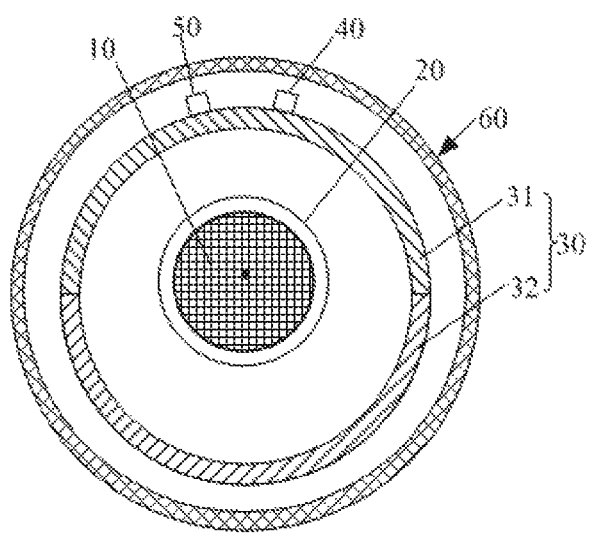
FIG. 10a-FIG. 10e are schematic diagrams showing various states of the transfer plate being pre-processed by the transfer plate pre-processing device.

Step 1: moving the cylinder 10 such that the axis of the cylinder 10 substantially coincides with the axis of the pressurization structure 30, and providing the transfer plate 20 around the cylinder 10, as shown in FIG. 10a.

Figure 10B:
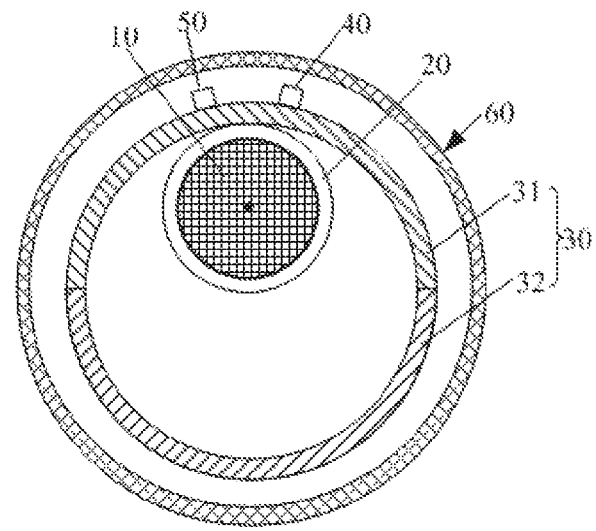

Step 2: moving the cylinder 10 such that the transfer plate 20 is brought into contact with and pressurized against the first wetting part 31, as shown in FIG. 10b.

Figure 10C:
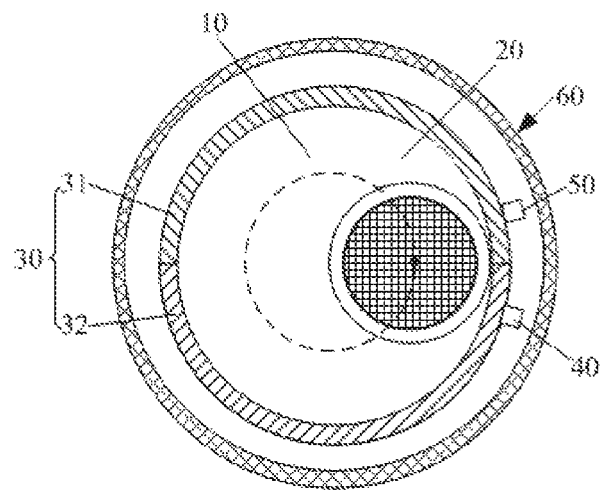

Step 3: controlling the cylinder 10 so as to roll along an inner surface of the pressurization structure 30, as shown in FIG. 10c. In particular, the cylinder 10 rotates in a counter-clockwise direction about its axis while moving along a path as shown in a dashed line in a clockwise direction. Normally, a speed of the cylinder 10 moving along the path as shown in the dash line is about 20 m/min. When the cylinder 10 is rolling, the fluid supply structure 40 and the fluid pumping structure 50 is displaced with the movement of the cylinder 10. In the case that the cylinder 10 has a stable speed, when the fluid supply structure 40 moves to the region of the first wetting part 31, the aligning agent begins being introduced into the first through-holes 31a of the first wetting part 31. By pressurizing the transfer plate 20 against the first wetting part 31, the aligning agent in the first wetting part 31 is transferred to the transfer plate 20.

Figure 10D:
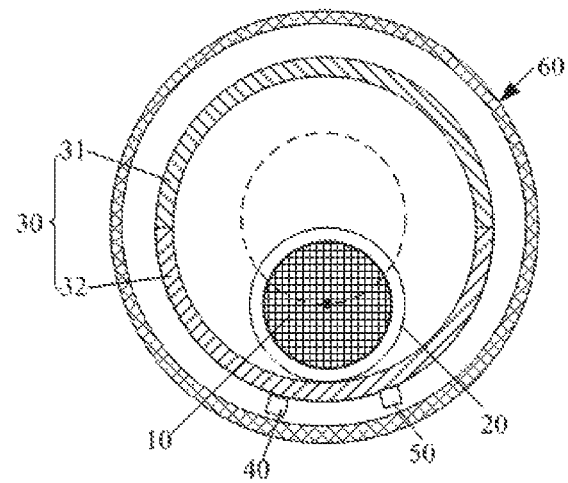
Figure 10E:
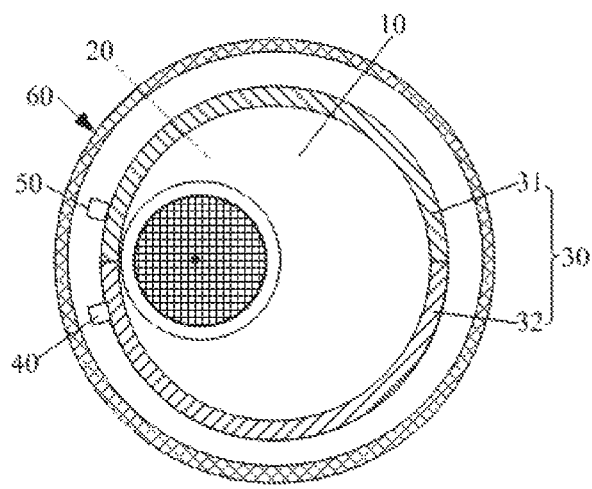

When the cylinder 10 moves to the region of the second wetting part 32, the fluid supply structure 50 is closed. By pressurizing the transfer plate 20 against the second wetting part 32, the aligning agent in the transfer plate 20 is transferred to the second wetting part 32. Subsequently, the fluid pumping structure 50 can be used to extract the aligning agent in the second wetting part 32, as shown in FIG. 10d. When the fluid supply structure 40 moves the region of the first wetting part 31 again, the aligning agent begins being introduced into the first through-holes 31a of the first wetting part 31, as shown in FIG. 10e.

The circular motion in Step 3 is repeated as thus for 45-60 circles.

Step 4: closing the fluid supply structure 40 while opening the fluid pumping structure 50, and controlling the fluid supply structure 40 and the fluid pumping structure 50 to move for 5-10 circles to recycle the aligning agent remaining on the pressurization structure 30 and the transfer plate 20. The cylinder 10 returns to the position where it starts moving, as shown in FIG. 10e.

Step 5: moving the cylinder 10 such that the axis of the cylinder 10 substantially coincides with the axis of the pressurization structure 30, and removing the transfer plate 20 from the cylinder 10.

As still another aspect of the disclosure, there is provided an alignment film preparation system, comprising an aligning agent application device and above transfer plate pre-processing device, the aligning agent application device comprising a transfer plate, the transfer plate being configured to transfer aligning agent to a substrate to form an alignment film, wherein the transfer plate is a transfer plate pre-processed by the transfer plate pre-processing device.

Since the wettability of a transfer plate can be improved after the transfer plate is pre-processed by using the transfer plate pre-processing device, when the aligning agent application device uses the pre-processed transfer plate to apply the aligning agent to the substrate, the thickness of the aligning agent can be prevented being discrepant over time. As a result, it is possible to increase the thickness uniformity of the aligning agent and improve the preparation effect of the alignment film.

It should be understood that the above implementations are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

The invention claimed is:

1. A transfer plate pre-processing device, comprising a transfer plate for transferring an aligning agent, a cylinder, and a pressurization structure, wherein
   the transfer plate comprises a first surface on which recesses are arranged in an array and a second surface which is opposite to the first surface;
   the cylinder comprises a bearing surface that is configured to be attached to the second surface of the transfer plate and to support the transfer plate; and
   the pressurization structure comprises a pressurizing surface,
   wherein, the cylinder is configured to roll along the pressurizing surface of the pressurization structure, and when the cylinder carrying the transfer plate is rolling, the first surface of the transfer plate is brought into contact with and pressed against pressurizing surface, and
   wherein, the pressurization structure is divided into a first wetting part and a second wetting part, a plurality of first through-holes penetrating the first wetting part in a radial direction of the pressurization structure to introduce the alignment agent are arranged in the first wetting part, a plurality of second through-holes penetrating the second wetting part in the radial direction of the pressurization structure to extract the alignment agent are arranged in the second wetting part, and each of inner diameters of the first through-holes and the second through-holes is not more than an inner diameter of an opening of each of the recesses on the transfer plate.

2. The transfer plate pre-processing device according to claim 1, wherein,
   the pressurization structure is configured as a cylindrical structure surrounding the cylinder,
   an axis of the cylinder is parallel with an axis of the pressurization structure, and the pressurizing surface corresponds to an inner surface of the cylindrical structure.

3. The transfer plate pre-processing device according to claim 1, wherein
each first through-hole has a first opening far away from the axis of the pressurization structure and a second opening close to the axis of the pressurization structure,
an inner diameter of the second opening of each first through-hole is equivalent to the inner diameter of the opening of the recess on the transfer plate, and
an inner diameter of the first opening of each first through-hole is less than the inner diameter of the second opening of each first through-hole.

4. The transfer plate pre-processing device according to claim 1, wherein
each second through-hole has a first opening close to the axis of the pressurization structure and a second opening far away from the axis of the pressurization structure,
an inner diameter of the first opening of each second through-hole is less than the inner diameter of the opening of recess on the transfer plate, and
an inner diameter of the second opening of each second through-hole is less than the inner diameter of the first opening of each second through-hole.

5. The transfer plate pre-processing device according to claim 4, wherein
each second through-hole comprises a tapered through-hole part and a cylindrical through-hole part which are arranged to be coaxial,
one end of the tapered through-hole part is the first opening of each second through-hole, and the other end of the tapered through-hole part is in communication with one end of the cylindrical through-hole part, and
the other end of the cylindrical through-hole part is the second opening of each second through-hole.

6. The transfer plate pre-processing device according to claim 1, wherein
the transfer plate pre-processing device further comprises a fluid supply structure and a fluid pumping structure,
the fluid supply structure and the fluid pumping structure are disposed on a side of the pressurization structure far away from the cylinder,
the fluid supply structure is configured to introduce the aligning agent to the first through-holes,
the fluid pumping structure is configured to extract the aligning agent out of the second through-holes,
when the transfer plate is brought into contact with and pressurized against the first wetting part, the aligning agent in the pressurized first through-holes is able to flow into the recess of the transfer plate, and
when the transfer plate is brought into contact with and pressurized against the second wetting part, the aligning agent in the recess of the transfer plate is able to flow into the pressurized second through-holes.

7. The transfer plate pre-processing device according to claim 6, wherein
when the cylinder is rolling, the fluid supply structure and the fluid pumping structure are both able to move along a circumferential direction of the pressurization structure with respect to the pressurization structure,
during the movement, the fluid supply structure and the fluid pumping structure are kept stationary relatively to an axis of the cylinder,
during the movement, the fluid supply structure and the fluid pumping structure are positioned on both side of a position where the transfer plate is in contact with and pressurized against the pressurization structure, respectively, and
a distance of the fluid supply structure from the pressurized position and a distance of the fluid pumping structure from the pressurized position are both less than a predefined value.

8. The transfer plate pre-processing device according to claim 6, wherein
the transfer plate pre-processing device further comprises an outside bearing structure provided around the pressurization structure, the bearing structure being fixed to the pressurization structure,
the bearing structure comprises a main body and a receiving chamber inside the main body, the fluid supply structure and the fluid pumping structure being positioned within the receiving chamber, and
an opening is formed on a surface of the main body facing the pressurization structure, through which the fluid supply structure introduces the aligning agent into the first through-holes and through which the fluid pumping structure extracts the aligning agent out of the second through-holes.

9. The transfer plate pre-processing device according to claim 8, wherein
the main body comprises a cylindrical first wall, a cylindrical second wall provided outside the first wall and a connecting wall for connecting the first wall and the second wall,
the first wall, the second wall and the connecting wall form the receiving chamber,
the opening is formed in the first wall, and
the pressurization structure is fixed to the first wall.

10. The transfer plate pre-processing device according to claim 9, wherein
a guide rail is provided in the receiving chamber and arranged so as to surround the pressurization structure along the circumferential direction of the pressurization structure; and
the fluid supply structure and the fluid pumping structure are movably mounted on the guide rail.

11. The transfer plate pre-processing device according to claim 6, wherein
sensors are provided at joints between the first wetting part and the second wetting part, and
the sensors are configured to detect whether the fluid supply structure and the fluid pumping structure pass through the positions corresponding to the sensors.

12. A transfer plate pre-processing method comprising steps of:
providing a transfer plate pre-processing device, wherein
the transfer plate pre-processing device comprises a transfer plate for transferring an aligning agent, a cylinder, a pressurization structure, a fluid supply structure and a fluid pumping structure,
the transfer plate comprises a first surface on which recesses are arranged in an array and a second surface which is opposite to the first surface, the cylinder comprises a bearing surface that is configured to be attached to the second surface of the transfer plate and to support the transfer plate, and
the pressurization structure comprises a pressurizing surface,
the cylinder is configured to roll along the pressurizing surface of the pressurization structure, and when the cylinder carrying the transfer plate is rolling, the first surface of the transfer plate is brought into contact with and pressed against pressurizing surface, the pressurization structure is divided into a first wetting part and a second wetting part, a plurality of first through-holes penetrating the first wetting part in a radial direction of the pressurization structure to introduce the alignment agent are arranged in the first wetting part, a plurality of second through-holes penetrating the second wetting part in the radial direction of the pressurization structure to extract the alignment agent are arranged in the second wetting part, and each of inner diameters of the first through-holes and the second through-holes is not more than an inner diameter of an opening of each of the recesses on the transfer plate;

before applying aligning agent to a substrate, providing the transfer plate around the bearing surface of the cylinder;

controlling the cylinder so as to roll along the pressurizing surface of the pressurization structure, such that when the cylinder is rolling, the first surface of the transfer plate is brought into contact with and pressed against the pressurizing surface of the pressurization structure;

introducing, by the fluid supply structure, the aligning agent to the first through-holes when the fluid supply structure is positioned in a region of the first wetting part; and extracting, by the fluid pumping structure, the aligning agent out of the second through-holes when the fluid pumping structure is positioned in a region of the second wetting part.

13. An alignment film preparation system, comprising an aligning agent application device and a transfer plate pre-processing device, wherein the transfer plate pre-processing device comprises a transfer plate for transferring an aligning agent, a cylinder and a pressurization structure;

the transfer plate comprises a first surface on which recesses are arranged in an array and a second surface which is opposite to the first surface, the cylinder comprises a bearing surface that is configured to be attached to the second surface of the transfer plate and to support the transfer plate, and the pressurization structure comprises a pressurizing surface;

the cylinder is configured to roll along the pressurizing surface of the pressurization structure, and when the cylinder carrying the transfer plate is rolling, the first surface of the transfer plate is brought into contact with and pressed against pressurizing surface;

the pressurization structure is divided into a first wetting part and a second wetting part, a plurality of first through-holes penetrating the first wetting part in a radial direction of the pressurization structure to introduce the alignment agent are arranged in the first wetting part, a plurality of second through-holes penetrating the second wetting part in the radial direction of the pressurization structure to extract the alignment agent are arranged in the second wetting part, and each of inner diameters of the first through-holes and the second through-holes is not more than an inner diameter of an opening of each of the recesses on the transfer plate; and the aligning agent application device comprises an instilment structure and a distributing roller, and is configured to instill the aligning agent from the instilment structure onto the distributing roller and further to transfer the aligning agent from the distributing roller to the transfer plate which is pre-processed by the transfer plate pre-processing device, the transfer plate being configured to transfer aligning agent to a substrate to form an alignment film.

14. The alignment film preparation system according to claim 13, wherein the pressurization structure is configured as a cylindrical structure surrounding the cylinder, an axis of the cylinder is parallel with an axis of the pressurization structure, and the pressurizing surface corresponds to an inner surface of the cylindrical structure.

15. The alignment film preparation system according to claim 13, wherein each first through-hole has a first opening far away from the axis of the pressurization structure and a second opening close to the axis of the pressurization structure, an inner diameter of the second opening of each first through-hole is equivalent to the inner diameter of the opening of the recess on the transfer plate, and an inner diameter of the first opening of each first through-hole is less than the inner diameter of the second opening of each first through-hole.

16. The alignment film preparation system according to claim 13, wherein each second through-hole has a first opening close to the axis of the pressurization structure and a second opening far away from the axis of the pressurization structure, an inner diameter of the first opening of each second through-hole is less than the inner diameter of the opening of recess on the transfer plate, and an inner diameter of the second opening of each second through-hole is less than the inner diameter of the first opening of each second through-hole.

17. The alignment film preparation system according to claim 16, wherein each second through-hole comprises a tapered through-hole part and a cylindrical through-hole part which are arranged to be coaxial, one end of the tapered through-hole part is the first opening of each second through-hole, and the other end of the tapered through-hole part is in communication with one end of the cylindrical through-hole part, and the other end of the cylindrical through-hole part is the second opening of each second through-hole.

18. The alignment film preparation system according to claim 13, wherein the transfer plate pre-processing device further comprises a fluid supply structure and a fluid pumping structure, the fluid supply structure and the fluid pumping structure are disposed on a side of the pressurization structure far away from the cylinder, the fluid supply structure is configured to introduce the aligning agent to the first through-holes, the fluid pumping structure is configured to extract the aligning agent out of the second through-holes, when the transfer plate is brought into contact with and pressurized against the first wetting part, the aligning agent in the pressurized first through-holes is able to flow into the recess of the transfer plate, and when the transfer plate is brought into contact with and pressurized against the second wetting part, the aligning agent in the recess of the transfer plate is able to flow into the pressurized second through-holes.

* * * * *